May 19, 1970 — C. C. LAVAL, JR — 3,512,651
DEVICE FOR REMOVING SOLID PARTICLES FROM LIQUID
Filed Sept. 6, 1968 — 3 Sheets-Sheet 1
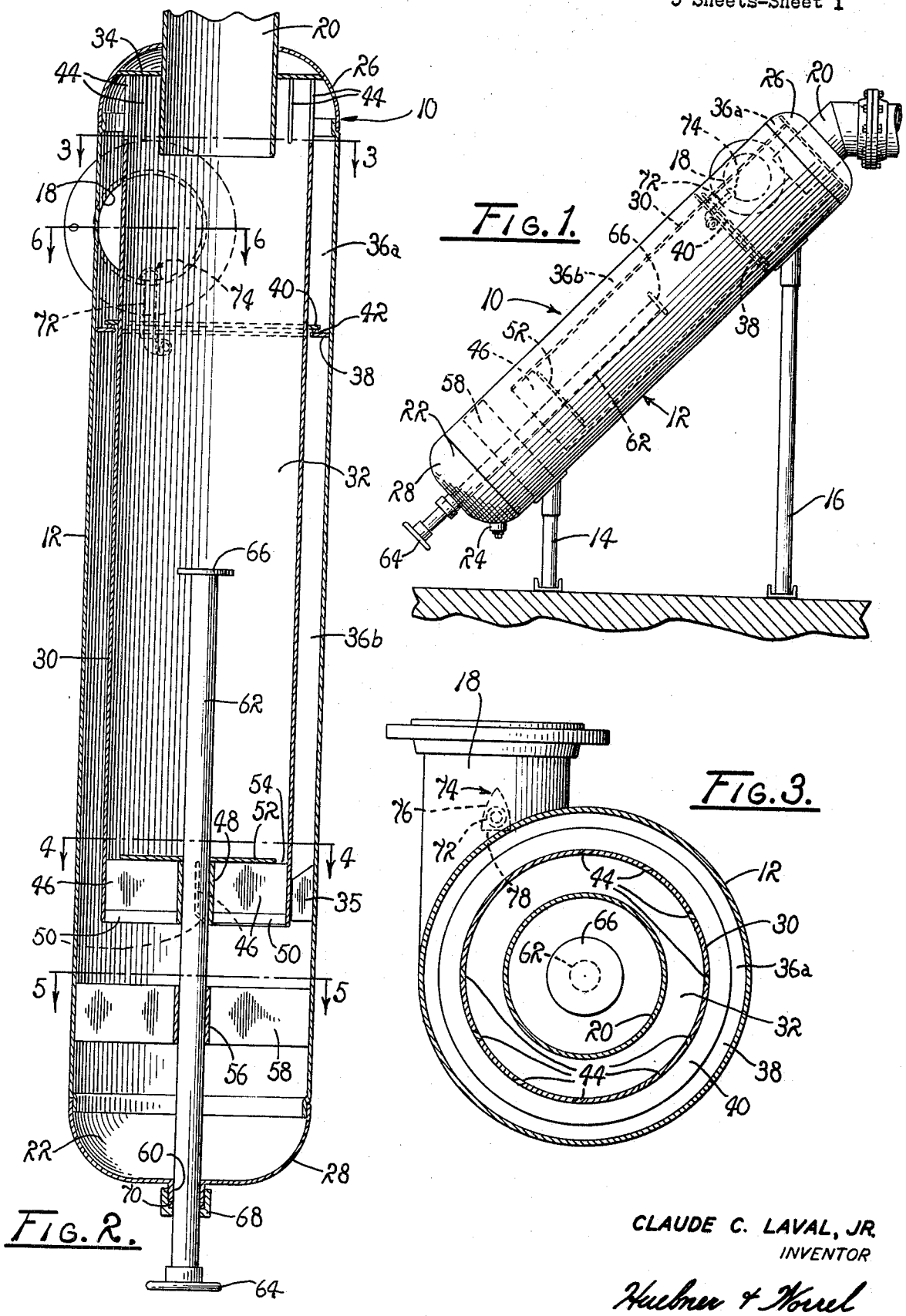
CLAUDE C. LAVAL, JR.
INVENTOR
Huebner & Worrel
ATTORNEYS

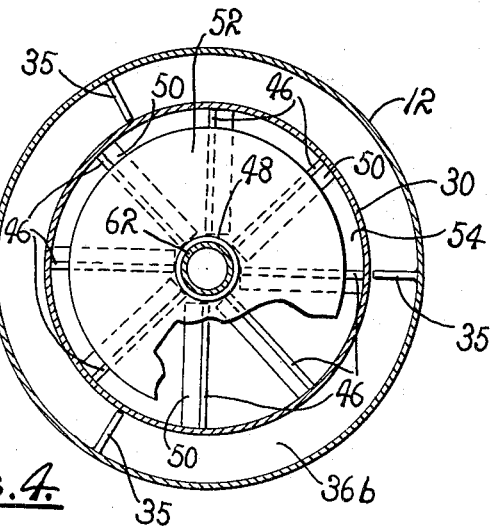
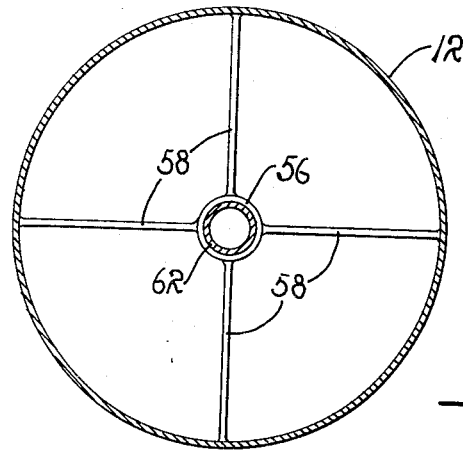
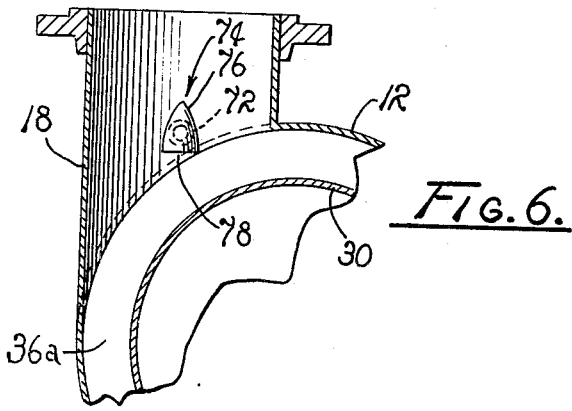

CLAUDE C. LAVAL, JR.
INVENTOR

Huebner & Worrel
ATTORNEYS

United States Patent Office 3,512,651
Patented May 19, 1970

3,512,651
DEVICE FOR REMOVING SOLID PARTICLES FROM LIQUID
Claude C. Laval, Jr., 2444 N. Farris Ave.,
Fresno, Calif. 93705
Filed Sept. 6, 1968, Ser. No. 757,949
Int. Cl. B04c 5/103
U.S. Cl. 210—512                    15 Claims

ABSTRACT OF THE DISCLOSURE

A device for removing solid particles from a fluid including a casing with a cylindrical vortex chamber having inlet openings at one end adapted to impart a swirling motion to fluids passing therethrough. Intermediate the ends of the vortex chamber are a circular reaction plate and an annular baffle longitudinally spaced and concentrically disposed therewithin. The reaction plate is mounted for longitudinal adjustment relative to the conduit and has transverse dimensions which are considerably less than those of the baffle. A small portion of the fluid which passes the baffle is drawn off by a suction means in the inlet to augment the solid removing effect of the device.

CROSS-REFERENCE TO RELATED APPLICATION

This application is related to U.S. Pat. No. 3,289,608, granted Dec. 6, 1966, as will hereinafter more fully appear.

BACKGROUND OF THE INVENTION

The present invention relates to devices for separating solid particles from fluids and more particularly to a separating device for improved separation and removal of solid particles from particle laden fluids, as for example, the removal of sand, silt, clay and the like from water pumped from wells, reservoirs, sumps, ditches and the like and circulated in distribution systems.

As indicated in the aforementioned U.S. Pat. No. 3,289,608, the presence of such solid particles causes considerable inconvenience and annoyance in municipal, industrial, and agricultural water supply systems where the water is employed for washing, cooking, drinking, irrigating, sanitation and other purposes. Water having considerable quantities of sand accelerates wear and causes clogging of equipment such as meters, sprinklers and other dispensing fixtures at the service ends of the systems. This problem is particularly onerous in agricultural sprinkler installations having water fogging or spraying nozzle heads. Such nozzle heads frequently have very small orifices which are easily clogged by even the most minute solid particles in the water.

SUMMARY OF THE INVENTION

It is therefore an object of the present invention to provide an improved separating device for the separation and removal of solid particles from particle laden fluids.

Another object is to provide an improved separating device which swirls the flow of fluid therethrough for centrifugal separation of solid particles from the fluid.

Another object is to provide such a separating device which has a quiescent particle collecting chamber for augmenting the separating effect of the centrifugal separation.

Another object is to provide an improved separating device which swirls the flow of fluid therethrough in a progressively thickening influx layer and reflects the innermost portion of such layer axially of the layer toward a fluid outlet.

Another object is to provide such a separating device in which the extent of the centrifugal separation can be selectively predetermined.

Another object is to provide such a separating device in which part of the influx layer is caused to lose its swirling motion for quiescent settling of the particles therein.

Another object is to provide such a separating device which has a quiescent particle collecting chamber and vacuum means insuring a dependable flow to said chamber to achieve improved separation.

Another object is to provide such a vacuum means in the inlet of the device to recirculate fluid drawn off from the chamber.

Another object is to provide such a separating device in which the fluid returned to the inlet is proportional to the amount of fluid flowing through the inlet.

These and other objects and advantages are achieved by a separating device including an elongated casing with a concentrically disposed cylindrical vortex chamber therewithin and a concentric outlet at one end. The other end of the casing provides a settling chamber for receiving the particles separated from the fluid. The fluid is injected into the vortex chamber through a series of openings disposed in circumscribing relation to the outlet, the openings imparting a swirling motion to the fluid so that it moves toward the settling chamber in a centrifuging helical path and develops an influx layer which becomes progressively thicker downstream. Intermediate the ends of the vortex chamber is a circular reaction plate which is longitudinally adjustable relative to the outlet for deflecting the innermost portion of the influx layer and turning it toward the outlet, the longitudinal positioning of the reaction plate regulating a vortex and determining the extent of the influx layer so turned. Downstream from the reaction plate is an annular baffle concentrically disposed in the vortex chamber and having a peripheral edge spaced slightly therefrom through which the outermost portion of the influx layer is adapted to pass. After the fluid passes the baffle it encounters radially disposed fins which inhibit any continued inertial swirling motion for rendering the fluid quiescent and enhancing settling out of the solid particles. A portion of the fluid from which the particles have been separated is caused to move through the space between the casing and the vortex chamber into the inlet through a suction means therein to create a slight negative pressure downstream from the baffle and fins for increased efficiency of the device.

DESCRIPTION OF THE DRAWINGS

FIG. 1 is a side elevation of a separating device embodying the principles of the present invention.

FIG. 2 is an enlarged longitudinal section of the device.

FIG. 3 is an enlarged transverse section taken on line 3—3 of FIG. 2.

FIG. 4 is an enlarged transverse section taken on line 4—4 of FIG. 2 with parts broken away.

FIG. 5 is an enlarged transverse section taken on line 5—5 of FIG. 2.

FIG. 6 is an enlarged fragmentary section taken on line 6—6 of FIG. 2 showing the suction mechanism.

DESCRIPTION OF EMBODIMENT

Figure 7:
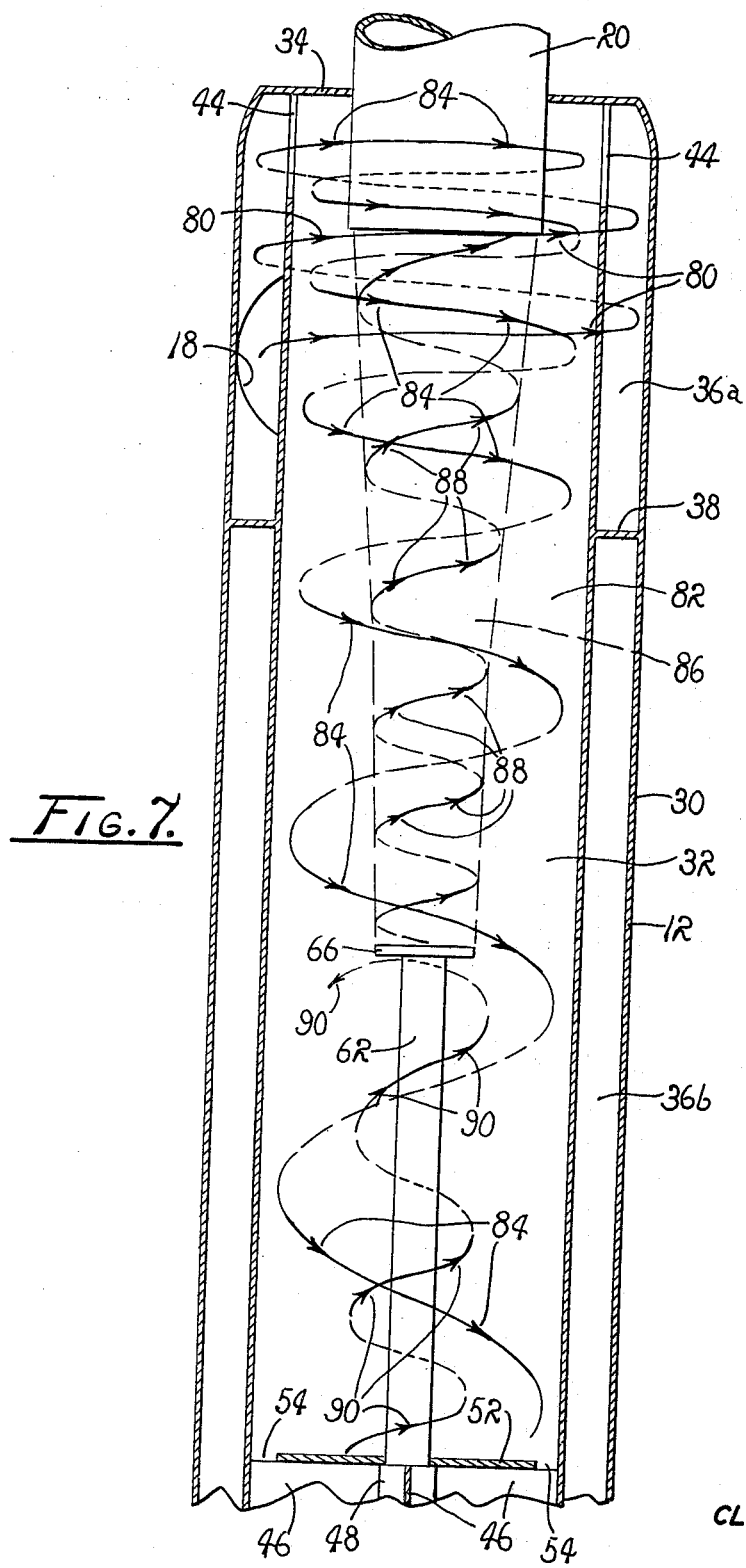
FIG. 7 is an enlarged schematic view of a portion of FIG. 2 with helical lines schematically illustrating the swirling motion of the fluid, the foreground portions of such lines being shown in solid lines and the background portions thereof in dashed lines.

Referring to the drawings, there is shown in FIG. 1 a separating device 10 embodying the principles of the present invention and including a shell of cylindrical casing 12 supported on members 14 and 16 and having a inlet conduit 18 and an outlet conduit 20. As will later appear, a particle laden fluid, such as water containing sand and/or other solid particles, is admitted through the inlet conduit and caused to enter the casing to form a swirling influx layer therein which centrifuges the particles to the outer portions of the layer, the clear central portion passing out through the outlet conduit. Eventually, the particles collect in a sediment or settling chamber 22 at the opposite end of the casing and are periodically drained or otherwise removed therefrom through a drain outlet 24.

As shown in FIG. 2, the casing 12 is cylindrical and has ends closed off by caps 26 and 28, the outlet conduit being centrally disposed in cap 26 and coaxial with the casing. Also disposed coaxially in the casing, is a cylindrical wall or barrel 30 defining a vortex chamber 32, one end of the wall being in circumscribing relation to the outlet conduit and sealed off by an annular end plate 34. The other end of the barrel is held in coaxial relation to the casing by a plurality of spacers 35. Three such spacers, fixed to the casing 120 degrees apart, suffice for the purpose. The casing and the barrel form a double wall construction defining an annular chamber 36a and an annular space 36b. One end of the chamber 36a is closed off by the cap 26 and the plate 34, the other end is closed off by an annular plate 38 fixed to the casing 12 and an overlapping plate 40 fixed to the barrel with a gasket or seal 42 between the plates.

Referring also to FIG. 3, the end of the barrel which is disposed in circumscribing relation to the outlet conduit is provided with a plurality of elongated orifices or slot inlet openings 44 through which fluid is adapted to be injected into the vortex chamber obliquely to impart a swirling motion to the fluid. As shown also in FIG. 4, the other, or downstream, end of the barrel has mounted thereon a plurality of plates or fins 46 extending radially inwardly which support a tube 48 coaxially of the barrel. The downstream edge of each fin is provided with a bent portion or lip 50 for a purpose later appearing. The upstream edges of the fins support a circular plate or baffle 52 having a transverse extent such as to provide a small space 54 between the peripheral edge thereof and the inner surface of the barrel. The openings 44 are preferably, but not necessarily, provided with the resiliently flexible lips or distendable spouts of my copending U.S. patent application, Ser. No. 656,312, filed July 24, 1967.

Downstream from the tube 48 is another tube 56 supported coaxially of the casing 12 by radial plates or fins 58, best seen in FIGS. 2 and 5. The end cap 28 has a sleeve portion 60 and mounted for sliding therein and in the tubes is a tubular support 62 provided with a handle 64 and a deflector or reaction plate 66. The tubular support is adapted to be adjusted longitudinally for positioning the deflector, as desired. To this end, the sleeve portion is externally screw-threaded for engagement with an internally threaded cap nut 68 for compressing a resilient ring of material 70 and deforming it to exert frictional and fluid-tight holding pressure against the support.

Referring also to FIG. 6, a fluid passageway, such as a pipe 72 or the like, connects the upstream end of the annular space 36b with the interior of the inlet conduit 18. The end of the pipe in the inlet conduit is provided with a venturi or suction mechanism 74 including a cover 76 having side edges sealed to the conduit and an open end 78 which faces in the direction of movement of the fluid through the conduit. Thus, with fluid flowing through the conduit, a suction is created within the cover and fluid is sucked through the pipe.

It is to be noted that the inlet conduit is joined to the casing 12 so that fluid under pressure admitted through the conduit enters the annular chamber 36a substantially tangentially and is caused to follow a swirling path, as indicated schematically by a helical line with arrowheads 80 in FIG. 7. Such swirling fluid moves longitudinally of the chamber 36a and in due course passes through the orifices or openings 44 with a swirling motion having a centrifugal effect. This causes the fluid to form a swirling helical influx layer 82 against the inner surface of the barrel which progressively increases in thickness as the fluid moves downstream and is somewhat frictionally retarded in the vortex chamber, as schematically indicated by a helical line with arrowheads 84. The layer 82 has a central or vortex portion 86 which reverses movement, while still maintaining the same direction of rotation, as schematically indicated by the helical line with arrowheads 88.

The vortexical effect described above and in the aforementioned patent is inherent to this type of centrifuging separator. However, the points at which the central portion of the influx layer commences its reverse movement is dependent upon a combination of several factors including the shape and volume of the vortex chamber, the initial speed of rotation of the influx layer, which in turn depends upon the pressure differential and the like.

One of the purposes of the present invention is to define more precisely such point of reversal. This is accomplished by positioning the deflector or reaction plate 66 the upstream face of which serves to separate and reflect the central portion of the influx layer from the peripheral portion or particle collection area of the layer and thereby facilitate reversal of clean fluid to the output of the device. Such peripheral portion, which is laden with the solid particles, moves slowly downstream following a helical path schematically indicated by the helical line with arrowheads 88 and eventually passes through the spaces 54 between the baffle and the vortex chamber wall 30.

The part of the influx layer downstream from the reaction plate 66 becomes increasingly quiescent with decreasing rotational velocity of the layer. However, this part also develops a central vortex which moves very slowly upstream, as indicated by the helical line with arrowheads 90 in FIG. 7. This vortex is deflected back into the downstream part of the layer by the downstream face of the reaction plate in a manner not to disturb the quiescence developing therein and to prevent mixing with the clean central portion of the layer that is reflected by the upstream face of the plate. The diameter of the reaction plate is not critical and can vary from a dimension which is about one-fourth of the diameter of the vortex chamber to about one-half thereof. In all cases, however, the diameter of the plate is less than that of the baffle.

The sediment chamber 22 is in that portion of the casing downstream of the vortex chamber 32 and constitutes a settling chamber in which the fluid heavily laden with particles is received for settling out of the particles and eventual draining thereof from the casing through the outlet 24. To facilitate settling out of the particles, it is desirable that the fluid in the chamber be as quiescent as possible. To this end, the fins 46 serve to attenuate any residual swirling motion of the fluid after it passes through the spaces 54. The movement of the fluid past the fins, coupled with deflection thereof by the lips 50, which deflection is opposite in direction to the swirling motion, acts to stop all swirling motion thereof and a substantially quiescent condition of the fluid is attained.

Although the separating device of the present invention has been shown and described in an inclined position, in actual practice it has been determined that it operates highly successfully vertically, horizontally or inverted. The device is capable of handling water with large quantities of sand and it has been found that no sand collects on the deflector and very little sand collects on the baffle. Properly adjusted, virtually no sand or other solids escape through the outlet conduit 20.

OPERATION

The operation of the device of the present invention is believed to be clearly apparent and is briefly summarized at this point. With the deflector or reaction plate 66 adjusted to the desired position, particle laden fluid is caused to flow through the inlet conduit 18 into the annular chamber 36a which causes the fluid to follow the path defined schematically by the line with arrowheads 80. The fluid is discharged from the chamber inwardly through the orifices 44 substantially tangentially to impart a helical swirling motion to the fluid along a path defined schematically by the line with arrowheads 84 and to form an influx layer 82. A centrifuging action is induced which causes the particles in the fluid to move outwardly against the wall 30 of the vortex chamber 32. The fluid layer moves helically downstream and progressively becomes thicker and its rotational velocity decreases. The reaction plate 66 induces reversal of movement of the central portion of the influx layer toward the outlet conduit 20 and develops a vortex 86. The central portion of the influx layer passes through the outlet conduit with the peripheral portion thereof being engaged by the fluid jetting through the orifices 44 and a swirling motion is imparted thereto for additional centrifuging action. The outer peripheral portion of the influx layer that is not deflected by the reaction plate 66 passes downstream therefrom with a decreasing velocity and develops its own vortex. The downstream face of the plate deflects this vortex back into the influx layer which eventually flows past the baffle 52 and against the fins 46. The fins and lips 50 substantially stop any swirling motion remaining in the fluid which then becomes substantially quiescent, the particles therein settling out and are collected in the sediment chamber at the downstream end of the casing. In the meantime, substantially clean fluid is drawn off in small amounts on the upstream end of the annular space 36b through the pipe 72 as a result of the flow of water in the inlet conduit 18 past the suction mechanism 74 in a manner that provides a pressure differential which induces flow yet does not disturb the quiescent condition of the fluid in the sediment chamber. The return fluid is recycled through the device.

There has thus been provided a separating device for improved separation and removal of solid particles from particle laden fluids which is capable of handling fluids laden with large quantities of particles and selectively delivers a fluid output of desired cleanliness.

Having described my invention, what I claim as new and desire to secure by Letters Patent is:

1. A device for separating solid particles from fluids comprising a vortexing chamber having an outlet at one end and a sediment receiver at the other end, inlet means defining a series of oblique orifices disposed about the outlet operative to introduce a particle laden fluid stream into the chamber in a manner to impart to the stream a centrifuging action for throwing outwardly particles therein against the wall for movement to the receiver, and a transverse plate disposed within the chamber substantially centrally thereof for impingement of a portion of the stream against the plate to reflect said portion of the stream toward the outlet while permitting movement of the particles to the receiver.

2. A device as in claim 1 wherein said vortexing chamber has a substantially cylindrical wall and the outlet is centrally related thereto, and the plate means is a circular plate in facing relation to the outlet and longitudinally spaced therefrom.

3. A device as in claim 2 wherein the circular plate is mounted for longitudinal adjustment relative to the outlet.

4. The device of claim 1 further including radially disposed fins between the plate means and the receiver for inhibiting centrifuging action of the stream to provide a quiescent condition therein for settling of the particles and collection thereof in the receiver.

5. A device for separating solid particles from the fluids comprising a substantially cylindrical casing, a substantially cylindrical wall defining a vortexing chamber disposed within the casing substantially centrally thereof and defining therewith a double wall structure, an inlet conduit in communication with the structure for introducing a particle laden fluid stream under pressure thereinto, the vortexing chamber wall having jet orifices through which the stream is adapted to flow in a manner imparting thereto a swirling action for throwing outwardly particles therein and forming the stream into a substantially tubular formation with an outer layer against the wall heavily laden with particles and a substantially clear central portion, an outlet conduit at one end of the casing in communication with the chamber, the other end of the casing extending beyond the wall and serving as a receiving container in which the particles settle out, and plate means supported within the wall in spaced relation thereto for reflecting the central portion of the stream toward the outlet conduit, the outer layer of the stream flowing through the space between the plate means and the wall toward the container.

6. The device of claim 5 further including swirling motion inhibiting means disposed between the plate means and the container.

7. The device of claim 6 wherein a transverse baffle is associated with the swirling motion inhibiting means upstream therefrom, said baffle having a circular peripheral edge slightly spaced from the chamber wall and operative to direct the moving fluid stream thereto.

8. The device of claim 5 wherein the plate means is a circular plate in alignment with the outlet conduit and disposed centrally of the chamber wall.

9. The device of claim 8 in which the circular plate is adjustably positionable longitudinally of the chamber wall for movement toward and away from the outlet conduit.

10. The device of claim 8 wherein the transverse dimension of the circular plate is less than the transverse dimension of the baffle.

11. A device for separating solid particles from a fluid stream comprising a substantially cylindrical chamber having opposite ends, one of said ends having a substantially axially disposed outlet, inlet means for jetting the stream substantially tangentially into the chamber adjacent to the outlet whereby the stream swirls in the chamber in a centrifuging influx layer of progressively increased thickness towards the opposite end of the chamber and returns in a vortex of the same direction of rotation for discharge through the outlet, a reaction plate disposed substantially concentrically of the chamber intermediate opposite ends of the chamber operative as a fluid reflector to return a portion of the fluid of the influx layer into the vortex, means defining a cylindrical compartment concentric with said cylindrical chamber and having one end thereof in communication with the opposite end of the said chamber, whereby a portion of the fluid of the influx layer is delivered to the compartment, and a fluid conduit, including a venturi connecting the compartment with said inlet means adapted to return fluid delivered to the cylindrical chamber to the inlet means.

12. The device of claim 11 in which the plate is circular, is of a diameter substantially less than the chamber to define a peripheral passage therebetween and the fluid between the plate and said opposite end of the chamber is substantially quiescent for the settling of particles of solids therefrom.

13. The device of claim 11 including baffle means between the plate and said opposite end of the chamber adapted to impede fluid movement therein.

14. The device of claim 12 in which the plate is adjustably positionable axially of the chamber to regulate the point of return of fluid of the influx layer into the vortex to control the extent of centrifugation in the chamber.

15. A device for separating solid particles from a fluid stream comprising a substantially cylindrical chamber having opposite ends, one of said ends having a substantially axially disposed outlet, means for jetting the stream substantially tangentially into the chamber adjacent to the outlet, whereby the stream swirls in the chamber in a centrifuging influx layer of progressively increased thickness toward the opposite end of the chamber and returns in a vortex of the same direction of rotation for discharge through the outlet, a reaction plate disposed substantially concentrically of the chamber intermediate opposite ends of the chamber operative as a fluid reflector to return fluid of the influx layer into the vortex, and a circular baffle plate mounted substantially concentrically of the chamber between the reaction plate and said opposite end of the chamber constituting a secondary influx layer reflector.

References Cited

UNITED STATES PATENTS

| 2,010,435 | 8/1935 | Matheson | 210—84 X |
| 2,179,919 | 11/1939 | Carr et al. | 210—84 X |
| 2,672,215 | 3/1954 | Schmid | 210—512 X |
| 3,204,772 | 9/1965 | Ruxton | 210—512 |

J. L. DE CESARE, Primary Examiner

U.S. Cl. X.R.

209—211